(No Model.)

J. R. CONNOR.
CAKE PAN.

No. 260,166.  Patented June 27, 1882.

WITNESSES:
H. B. Brown
A. G. Syne

INVENTOR:
J. R. Connor
BY
ATTORNEYS.

UNITED STATES PATENT OFFICE.

JOHN R. CONNOR, OF SOUTH OIL CITY, PENNSYLVANIA.

CAKE-PAN.

SPECIFICATION forming part of Letters Patent No. 260,166, dated June 27, 1882.

Application filed December 3, 1881. (No model.)

*To all whom it may concern:*

Be it known that I, JOHN RICHARD CONNOR, of South Oil City, in the county of Venango and State of Pennsylvania, have invented a new and useful Improvement in Cake-Pans, of which the following is a full, clear, and exact description, reference being had to the annexed drawings, forming part of this specification.

This invention relates to separable pans for baking cakes; and it consists of a pan composed of an expansible rim, having a catch of peculiar construction by which the ends of the rim are held together under pressure to form a perfectly close joint, and a bottom, which is adapted to spring the rim open when the catch is released to avoid handling the heated pan with the fingers in removing the baked cake.

Figure 1:
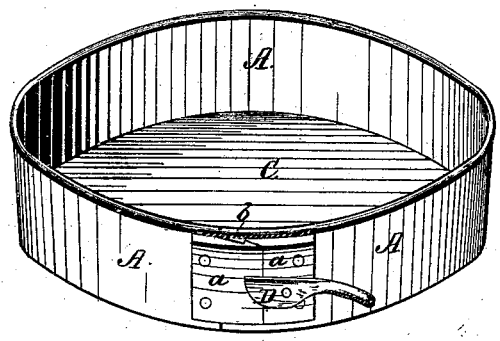
Figure 2:
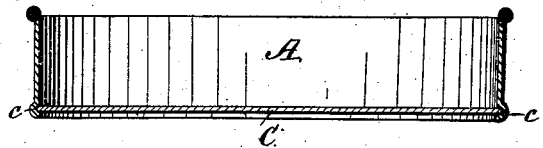
Figure 3:
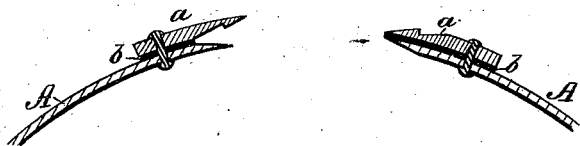

In the accompanying drawings, Figure 1 is a perspective view of my improved cake-pan. Fig. 2 is a vertical section, and Fig. 3 a horizontal section, of the same.

In separable cake-pans employing an expansible rim it is of great importance that a perfectly close joint shall be formed between the ends of the rim, to prevent the batter from escaping and thus forming a bead on the surface of the cake. As heretofore constructed, however, expansible rims in cake-pans have been held in a closed position by means of a hook, or, where the ends of the rim are made to overlap, by means of a set-screw, which is adjusted in slots in the rim; but the hook is not adapted for forming a close joint between the ends of the rim, because it relaxes its tension more or less when inserted home, and if made so as to avoid this it is liable to spring out of position. In the case of the set-screw, the slots in the rim for receiving the screw are objectionable for the reason that they allow the batter to escape.

To form a perfectly close joint for an expansible rim in a cake-pan, I employ two beveled catches, $a$ $a$, which are secured respectively to the two ends of the expansible rim A so that the bevel-surface of one catch shall be made to slide over that of the other under pressure until the two ends of the rim are pressed closely together.

The notches in the catches $a$ are in the form of obtuse angles, so that as the corresponding projections on the catches are pressed into the notches the ends of the rim will be drawn closer together.

For holding the catches in engagement with each other a pivoted arm or lever, D, is secured to one of the catches and adapted to be oscillated so as to press against the outer surface of the other catch, and thus force the projections into the bottoms of their respective notches.

The catches $a$ are to be made of malleable iron, about one-eighth of an inch thick, and of any suitable width and length.

Between the catches and the rim to which they are riveted I place strips of asbestus $b$, to prevent the communication of heat to the catches and lever, for the convenience of the cook.

The lower edge of the rim A is not wired, but is turned over inwardly toward the center, so as to form an outer seam and inner ledge, $c$, for supporting the bottom. The bottom C, which is made of the most elastic tin, or of any other suitable material, is designed to be of such a size that it shall require pressure to force it to position when the rim is closed, and thus shall exert pressure against the inner surface of the rim, so that its elasticity shall be utilized to cause the rim to spring open when the lever is withdrawn. With this construction, handling the heated pan in removing the baked cake is rendered unnecessary.

In putting the pan together the rim is first closed and secured by the adjustment of the lever. Then one side of the bottom is dropped to position, and pressure is exerted upon the opposite side or edge until the bottom is forced to a horizontal position.

Having thus described my invention, what I claim as new, and desire to secure by Letters Patent, is—

1. A separable cake-pan consisting of an expansible rim, combined with an elastic bottom and two overlapping catches, which are adapted to be pressed into engagement with each other by means of a lever pivoted to one of the catches, substantially as shown and described.

2. The combination of the rim A, the expansible bottom C, the bevel-catches *a a*, having obtuse-angled notches, the strips of asbestus *b*, and the pivoted lever D, substantially as shown and described.

JOHN RICHARD CONNOR.

Witnesses:
 FRANK BARR,
 JOHN McKISSICK.